(No Model.) 3 Sheets—Sheet 1.

W. HIPPERLING.
APPARATUS FOR THE MANUFACTURE OF TIN CANS.

No. 366,482. Patented July 12, 1887.

Fig. I.

WITNESSES:

INVENTOR
William Hipperling,
BY
Ellison & Gill.
ATTORNEYS.

(No Model.) 3 Sheets—Sheet 3.

W. HIPPERLING.
APPARATUS FOR THE MANUFACTURE OF TIN CANS.

No. 366,482. Patented July 12, 1887.

WITNESSES:
Gustave Dieterich
W. C. Matthis

INVENTOR
William Hipperling
BY
Ellison & Gill,
ATTORNEYS.

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

APPARATUS FOR THE MANUFACTURE OF TIN CANS.

SPECIFICATION forming part of Letters Patent No. 366,482, dated July 12, 1887.

Application filed May 10, 1887. Serial No. 237,718. (No model.)

*To all whom it may concern:*

Be it known that I, WILLIAM HIPPERLING, a citizen of the United States, and a resident of New York, in the county of New York and State of New York, have invented certain new and useful Improvements in Apparatus for the Manufacture of Tin Cans, of which the following is a specification.

The invention relates to improvements in apparatus for the manufacture of tin cans, and particularly to that part of the apparatus by which the seam in the side of the can is soldered and the superfluous solder removed.

The system of manufacture to which I have applied my invention consists of a machine to which are fed the flat blanks of tin, and which, prior to the blanks leaving the same, folds the sheet metal around a mandrel and secures its meeting edges together by a folded seam, after which the can-bodies, as they leave the machine, are placed in a traveling chain, (the same being downward,) which carries them along a suitable tramway to other machines, by which the ends of the can are applied, and prior to reaching which the can-bodies first pass through the usual acid solution, this flowing simply over the inner and outer part of the can where it is seamed, and then through a bed of liquid solder, which also passes over the seamed portions of the can, after which the body is carried first against a wiper which removes the superfluous solder from the outer side of said seam, and then against a wiper which removes the superfluous solder from the inner side of the body.

The particular invention sought to be protected hereby relates to the apparatus for holding the wiper by which the solder is removed from the inner side of the can, and to the use of the wiper for this purpose. After the can-bodies leave this part of the apparatus they are in condition to receive the ends.

Figure 1:
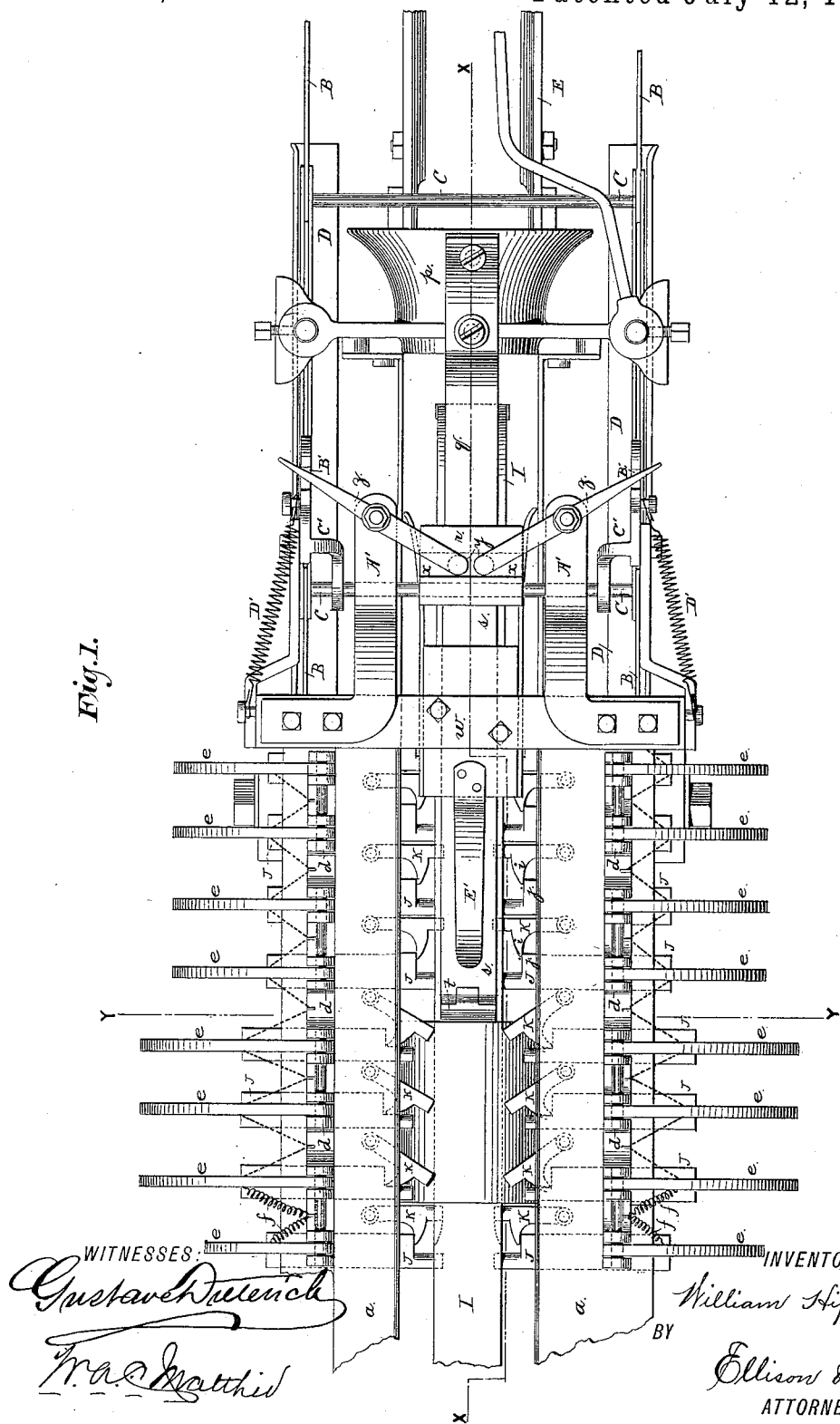
Figure 2:
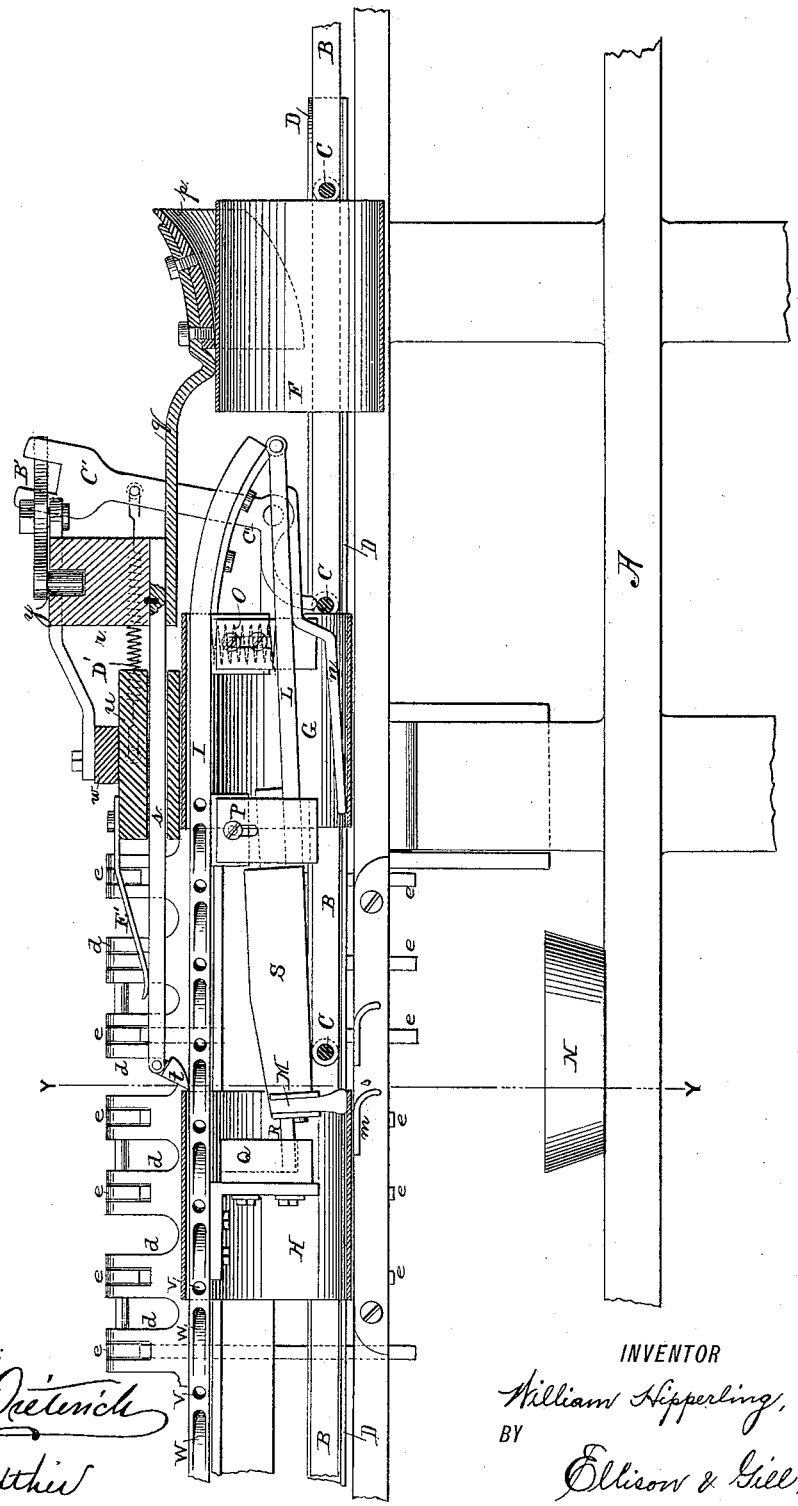
Figure 3:
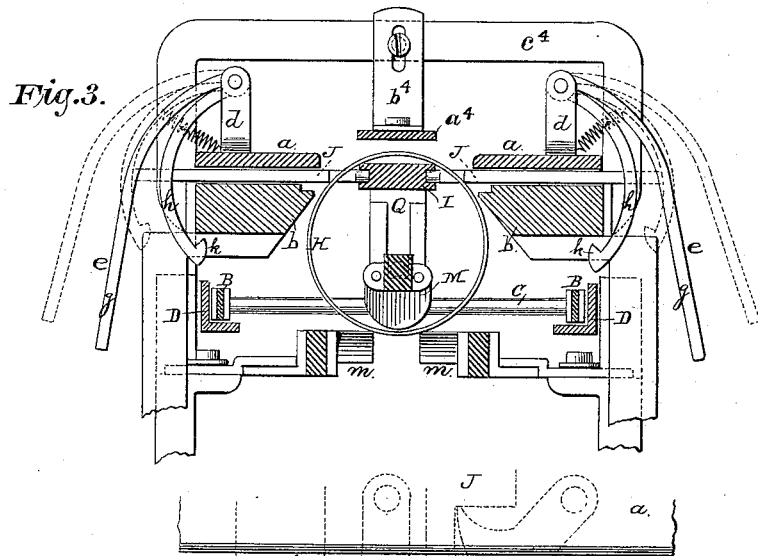
Figure 4:
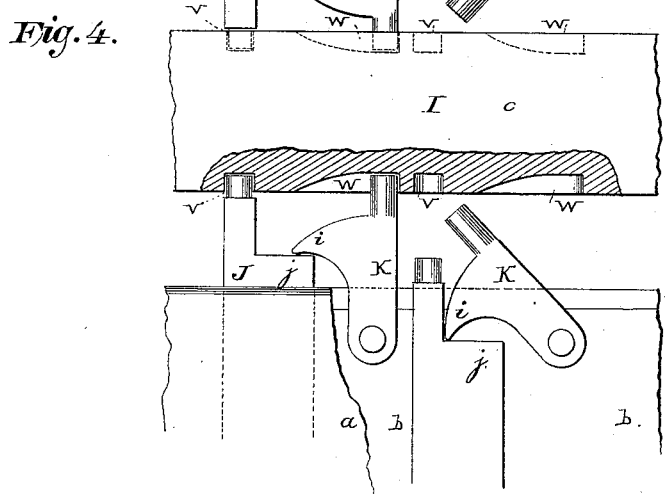
Figure 5:
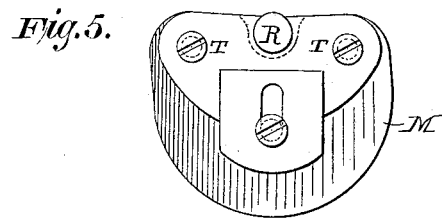

Figure 1 is a top view of an apparatus involving the elements of the invention. Fig. 2 is a vertical longitudinal section of same on the dotted line X X of Fig. 1. Fig. 3 is a vertical transverse section on the dotted line Y Y of Figs. 1 and 2. Fig. 4 is an enlarged top view of the suspended bar and means for securing it, hereinafter referred to; and Fig. 5 is an enlarged detached end view of the wiper.

In the drawings, A designates the supporting-frame; B, a traveling chain provided with rungs C, and adapted to move on the stationary way, composed of the angle-plates D, suitably supported at opposite sides of the frame A, as shown in Figs. 1 and 3. Upon the right-hand end of the frame of the machine is provided the tramway E, upon which the cans, as they leave the seaming-machine, are caused to travel prior to reaching the apparatus which is made the subject of this application. Upon the tramway E, which is concave in cross-section, the can-bodies are caused to pass through liquid solder, which flows upon the inside and outside of the can-body along the line of the seam thereof. The chain B and the tramway E, together with the supporting-frame A and angle-plates D, are of well-known construction, and are not sought to be protected hereby. As the can-bodies leave the seaming-machine they are placed on the tramway between the rungs of the chain B, and the latter traveling, said bodies are carried along the tramway, first through an acid solution, then through the liquid solder, and finally to the other machines, by which the heads are secured to the body.

The present invention embodies apparatus which is located at an intermediate point between that at which the solder is applied to the seam and the means by which the heads are applied, and hence in the drawings I illustrate but a small portion of the tramway E, and show particularly the elements sought to be protected.

The can-bodies traveling with the chain B are lettered F G H, respectively, in Fig. 2, upon reference to which figure it will be seen that the bodies are carried by the chain over the suspended bar I, which occupies a central position over the path of the chain B, and is suspended by means of the slides J and dogs K, a series of each of these elements being employed along the length and at each side of said bar, as illustrated more clearly in Fig. 1, and which will be hereinafter more fully described. The front end of the bar I curves slightly downward toward the chain B, and has hinged to its extremity the bar L, which extends toward the left, centrally, below and in line with the bar I, and has secured upon its end the wiper M, by which the superfluous solder is removed from the inner side of the can-body and caused to fall into the receptacle N, provided to receive it. Adjacent to the right-hand end of the bar L is provided the spring O, (shown in Fig. 2,) by which the bar is given a downward pressure, said spring being inclosed in a suitable box secured at its upper end to the bar I. To the bar I is also secured upon its under side the guide P and box Q, the former consisting of the plates arranged on opposite sides and at the bottom of the bar L, as shown in Fig. 2, and the former consisting of a hollow box adapted to receive the reduced end R of the bar L and to prevent it from being depressed unduly downward. Upon the bar L, between the wiper and the guide-box P, is applied a weight, S, to increase the downward pressure of the wiper upon the body of the can during the operation of the machine.

The wiper M, I prefer to construct of compressed paper, and to secure it between the plates by means of screws T. (Illustrated more clearly in Fig. 5.) Upon opposite sides of the bar I are cut the series of pockets V, to receive the reduced ends of the slides J, and the grooves W, to receive and permit the necessary movement therein of the ends of the dogs K.

In Fig. 4 the slides J, dogs K, and the bar I, having the pockets and grooves, are illustrated more clearly, and the dogs and slides are there shown in the two positions they assume during the operation of the machine, the dogs and slides at the left-hand side of the figure being in position to suspend the bar I, while the dogs and slides at the right-hand side of the figure are in the position they are caused to assume when the can-body has been carried against them by the chain B and has moved them away from the bar I and between the plates $ab$, between which they are secured, the slides being adapted to have a free transverse movement and the dogs a pivotal movement upon the pins retaining them, and illustrated by dotted lines in Fig. 1.

Upon the plates $a$, one being at each side of the machine, are secured between standards $d$ the series of levers $e$, which are caused to have a tension toward the machine by reason of their weight and of the action of the springs $f$, and are composed of two parts, lettered $g$ $h$, respectively. One of the levers $e$ is provided for and secured in line with each of the slides J, against the outer end of which the ends $h$ of the levers rest. The object of the levers $e$ is to keep a constant pressure against the slides J, in order that the reduced end of said slides may remain in the pocket V at all times, except when, during the movement of the can-body, the latter, pressing against the dogs, operates to force said slides outward, overcoming the weight of the levers $e$ and the tension of the springs $f$.

As soon as the can-body has passed beyond any pair of the dogs K the weight of the levers $e$ will immediately cause the slides J to resume their former position, said weight driving them inward and causing their reduced ends to enter the said pockets. At this time, also, the movement of the slides J reverses the former movement outward of the dogs K, causing the ends of the latter to enter the grooves W in the bar I. The dogs are provided with the lateral extension $i$, which impinges the shoulder $j$ on the slides J, and hence the first movement of the dogs caused by the traveling can is imparted to the slides, and then the return movement after the can has passed them, or any part of them, reacts on the dogs through the extensions $i$ to close them into the grooves W. The springs $f$ prevent the levers $e$ from being thrown unduly upward or away from the slides J during the rapid operation of the machine. The lower end of the arm $h$ of the levers $e$ is provided with the shoulder $k$, which comes into contact with the lower surfaces of the end of the slide J at the time said lever has reached its highest position, and thus effectually prevents the slide from ever losing its position between the plates $ab$. At that point of the apparatus at which the wiper M acts upon the inner surface of the can there are provided the longitudinal plates $m$, which support the can and are separated but a slight distance apart, their purpose being to firmly sustain the can-body while the wiper is acting upon it. If the plates $m$ were widely separated, the pressure of the wiper might have a tendency to distort the can, and besides be ineffective in removing the solder; but where the plates $m$ are made use of, the body will be firmly supported under the pressure of the wiper, and the superfluous solder will fall between them into the receptacle N. After the can-body has passed beyond the influence of the wiper M, it will leave the plates $m$ and be moved away upon the sides of the frame in the customary manner, as heretofore.

Upon the under side of the bar L is provided the rigid downwardly-depending plate $n$, which, during the operation of the apparatus, is acted upon by the rungs C of the chain B and by them elevated, whereby the bar L is turned upward upon its pivot and the wiper M relieved from contact with the can and caused to assume a position where it will not be struck by the rung C then approaching it. At each passage of a can-body from the wiper M the bar L is caused to ascend until the next succeeding can-body comes beneath the wiper M, at which time the bar L will descend, the plate $n$ at such time having ceased to be acted upon by the rung C which elevated it.

In order to direct the can-bodies traveling along the tramway E with the chain B to move centrally over and encircle the suspended bar I, carrying the hinged bar L, I have provided the outwardly-flaring mouth $p$, to the upper surface of which is rigidly affixed the bar $q$, which extends toward the left-hand end of the machine below the sliding block r, carrying the feed-bar s, the latter having upon its left-hand end the hinged dog t, whose point moves along the upper surface of the bar I, as shown in Figs. 1 and 2. The feed-bar s is arranged to move in the guide-block u, which is rigidly secured to the transverse bar w. (Shown in Fig. 1.) In the upper surface of the block r is provided the transverse groove x, in which are arranged the depending studs y, secured upon the facing ends of the levers z. The levers z are pivoted at about their centers to the plates A', (shown more clearly in Fig. 1,) and their outer ends rest within the slots B' of the bell-crank levers C', the latter being pivotally secured above the chain B, as shown in Fig. 2, and having their lower arms curved and projecting downward in position to be acted upon by the rungs C during the operation of the apparatus.

The drawings illustrate the lower arm of the bell-crank levers C' in their upper position upon the rung C, this being the position given to the levers as each rung of the chain B comes in contact with their lower arms. The purpose of the bell-crank levers C' and levers z is to force the block r and feed-bar s toward the left, thereby bringing the dog t against the edge of the can-body and pushing the latter forward under the wiper M and in advance of the rung of the chain which previously moved the can-body along the tramway. This position of the can-body is illustrated in Fig. 2, the can-body being lettered H. It is obvious that in the absence of the forward movement of the can-body caused by the feed-bar s the wiper M would be liable to be struck by the rung of the chain, and also that the solder wiped from the inner surface of the can would be prevented from dropping into the receptacle N. After the rung of the chain has passed the lower arm of the bell-crank levers C', the springs D' will retract the levers to their former position, creating a reverse movement through the levers z and drawing the feed-bar s toward the right in position to act upon the succeeding can when it has reached the wiper M. The dog t, being pivotally secured in the end of the bar s, will permit the passage of the can-body below it in one direction without restriction. Upon the block u is provided a leaf-spring, E', whose free end impinges the upper surface of the bar s, keeping it in position. After the can-body H has reached the position indicated in Fig. 2, the wiper-bar will be elevated by the arm n, in order that the rung of the chain which previously carried said body may again come into contact with and continue to move it. The chain has a continuous movement, and the can-body H is caused to move in advance of its rung C, owing to the fact that the feed-bar s has a more rapid motion than that of the chain.

In the operation of the apparatus the can-bodies, as above described, leaving the seaming-machine, are placed between the rungs of the chain B, which has a constant traveling movement, and draws the cans first through the acid solution and liquid solder, and then through the flaring mouth p into the apparatus constituting the invention. The movement of the chain continuing, the can-bodies are caused in succession to pass around and encircle the bars I L, during which movement they open the dogs K and slides J from the bar I, so as to have an unobstructed passage. The action of the rungs C upon the plate n and lower arm of the bell-crank levers C' regulates the feeding of the can-bodies under the wiper M and the vertical movement of said wiper after each can-body has been subjected to this action. The dogs K and slides J, one after another, open from the bar I under the pressure of the traveling can-body, and immediately close again in engagement with said bar (owing to the levers e) after the can-body has passed beyond them. Hence the bar I, having applied thereto the wiper, will always remain suspended, and at the same time permit the traveling movement of the can-body which encircles it. The exact number of the levers e, slides J, and dogs K made use of is unimportant, provided a sufficient number is employed to insure the suspension of the bar I while a part of them are disengaged by the can-body.

In Fig. 3 I illustrate above the bar I and slides J a horizontal bar, $a^4$, which is suspended above and in line with the bar I by the plate $b^4$, which is secured at its upper end by a set-screw to the frame $c^4$, consisting of a bar of iron bent to form the upper horizontal transverse part, and the two sides which are secured to the frame A. The bar $a^4$ may be used when desired to retain the can-bodies down against their tramway, and said bar $a^4$ should be suspended along its length by the means shown in Fig. 3, duplicated at the various points, so as to keep it evenly held.

What I claim as my invention, and desire to secure by Letters Patent, is—

1. In apparatus for the manufacture of tin cans, a bar having applied thereto a wiper, and being suspended by means which permit can-bodies to pass around it in succession for the purpose of having the superfluous solder on the inner side of the can-bodies removed, substantially as set forth.

2. In apparatus for manufacturing tin cans, the suspended bar having the wiper applied thereto, combined with a series of moving parts engaging said bar at opposite sides, and which give way before the pressure of the moving can, and then return to their position in engagement with the bar, substantially as set forth.

3. In apparatus for manufacturing tin cans, the suspended bar I, having the bar L hinged thereto, the latter carrying a wiper, combined with the series of dogs K, slides J, and levers e, substantially as and for the purposes described.

4. The suspended bar I, having the bar L hinged thereto, and carrying a wiper, combined with the traveling chain and feed mechanism adapted to be actuated by the rungs of the chain to move the can-bodies forward beneath the wiper, said rungs being also adapted to elevate the wiper after having acted upon a can-body, substantially as and for the purposes set forth.

5. In apparatus for manufacturing tin cans, the suspended bar I, having the bar L hinged thereto, and carrying the wiper, combined with the bell-crank levers C', rocking levers $z$, feed-bar $s$, having the pivoted dog $t$, and being in connection with said levers $z$, and the traveling chain, the rungs of which are adapted to act upon the bell-crank levers, substantially as set forth.

Signed at New York, in the county of New York and State of New York, this 7th day of May, A. D. 1887.

WILLIAM HIPPERLING.

Witnesses:
CHAS. C. GILL,
W. A. C. MATTHIE.